(12) United States Patent
Nemoto et al.

(10) Patent No.: US 11,316,326 B2
(45) Date of Patent: Apr. 26, 2022

(54) THERMAL CARTRIDGE DEVICE

(71) Applicant: Hakko Corporation, Osaka (JP)

(72) Inventors: Hisao Nemoto, Osaka (JP); Tomoyo Maeshima, Osaka (JP); Norihisa Sekimori, Osaka (JP)

(73) Assignee: Hakko Corp, Osaka (JP)

( * ) Notice: Subject to any disclaimer, the term of this patent is extended or adjusted under 35 U.S.C. 154(b) by 943 days.

(21) Appl. No.: 15/970,701

(22) Filed: May 3, 2018

(65) Prior Publication Data
US 2019/0341753 A1 Nov. 7, 2019

(51) Int. Cl.
*H02G 1/12* (2006.01)
*H05B 3/06* (2006.01)

(52) U.S. Cl.
CPC ........... *H02G 1/1278* (2013.01); *H05B 3/06* (2013.01); *H05B 2203/03* (2013.01)

(58) Field of Classification Search
CPC ..... H05B 3/06; H05B 2203/03; H02G 1/1278
USPC .......... 81/9.44; 219/230, 234, 221, 233, 240
See application file for complete search history.

(56) References Cited

U.S. PATENT DOCUMENTS

| | | | | | |
|---|---|---|---|---|---|
| 3,752,017 | A | * | 8/1973 | Lloyd | B29C 66/8227 81/9.44 |
| 3,980,861 | A | * | 9/1976 | Fukunaga | H02G 1/1275 219/230 |
| 4,932,291 | A | * | 6/1990 | Potesta | H02G 1/1278 219/233 |
| 5,016,500 | A | * | 5/1991 | Conrad | H02G 1/1278 219/233 |

FOREIGN PATENT DOCUMENTS

CN 204651807 9/2015

* cited by examiner

*Primary Examiner* — Joseph J Hail
*Assistant Examiner* — J Stephen Taylor
(74) *Attorney, Agent, or Firm* — David B. Abel

(57) ABSTRACT

A handheld device for thermal cartridges which may include a wire stripping cartridge for stripping insulation from sections of an insulated electrical wire, or a thermal tweezer cartridge for de-soldering and removing electrical components, and more particularly a hand-operated electrically heated thermal devices with a replaceable cartridges.

25 Claims, 6 Drawing Sheets

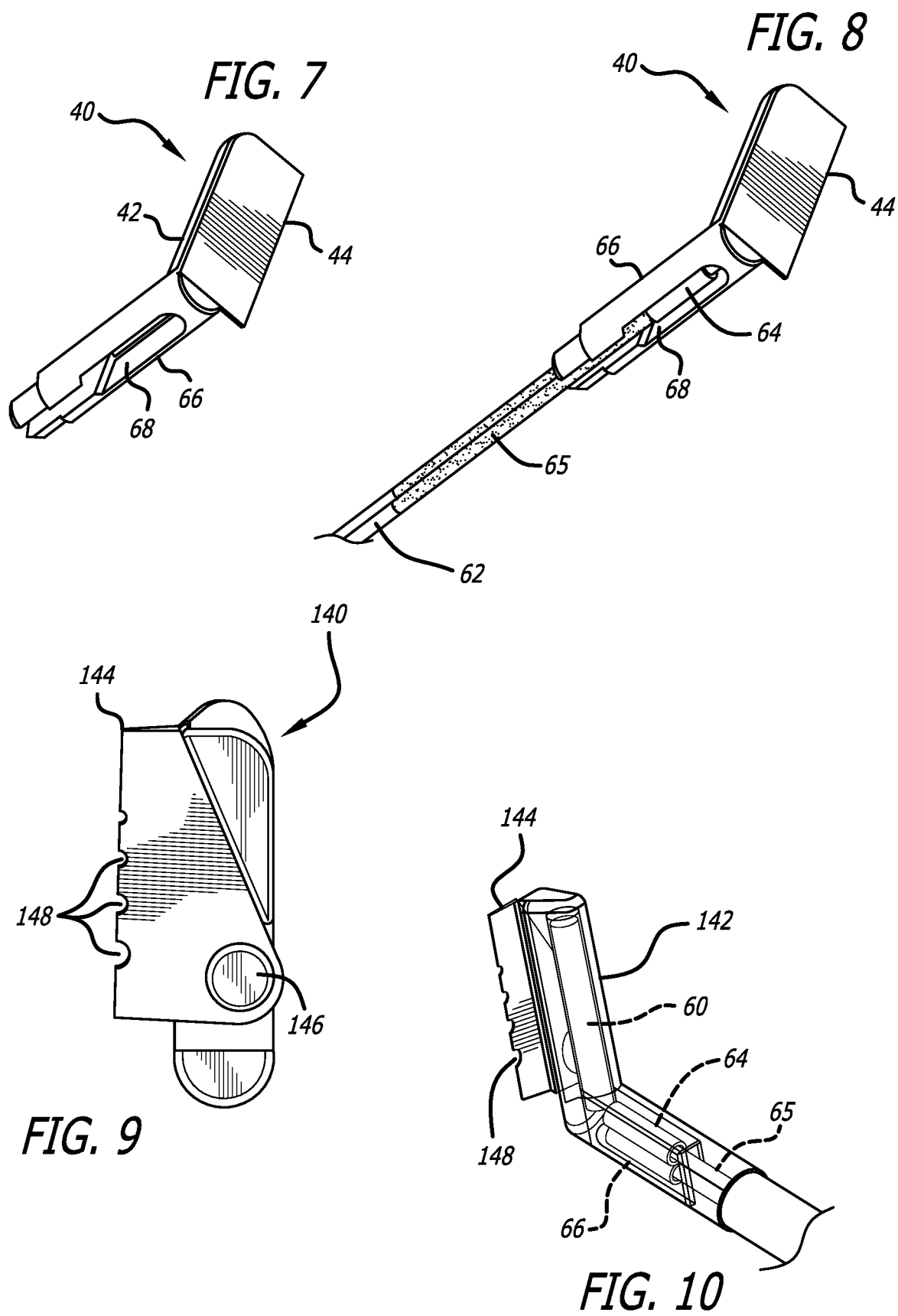

THERMAL CARTRIDGE DEVICE

BACKGROUND OF THE INVENTION

Field of the Invention

The present invention relates to thermal tools for electrical work including thermal devices for stripping insulation from sections of an insulated electrical wire and thermal tweezers for soldering and de-soldering operations.

Background and Prior Art

U.S. Pat. No. 3,980,861 describes a thermal wire stripper having a heating element embedded in the stripping blade. That patent describes mechanical wire stripping devices as well as thermal wire stripping devices. The thermal devices have the advantage of minimizing or avoiding the danger of nicking or cutting wires by the use of heat instead of a cutting blade to sever the thermal insulation, allowing the end of a wire to be exposed. Japanese Publication 2002-199535 discloses a simple wire stripper having blades that converge at an angle. A disadvantage of prior art thermal wire strippers is that the blades may be easily damaged when they are dropped, the heater will eventually burn out, and the blades may be chipped or damaged requiring the replacement of the entire device.

SUMMARY OF THE INVENTION

The present invention defines a hand held thermal device including interchangeable cartridges where for example one set of cartridges may comprise thermal wire stripper cartridges that may be mounted within a frame that has two prongs extending from a handle assembly, with the end of each prong supporting a chuck for receiving the thermal wire stripper cartridge, with each cartridge including a stripping blade. The blade cartridge is removably mounted into the chuck, and the chuck includes features to position the stripping blade cartridges in the chucks on the respective prongs to precisely position the stripping blades in an opposed relationship. The thermal device may also be used with thermal tweezer cartridges. The thermal tweezer cartridges and the thermal wire stripper cartridges include heating elements disposed in their distal sections and electrical contacts and conductors to couple the heating elements to a power supply. The hand held thermal device accommodating removable and interchangeable cartridges overcomes the disadvantages of the prior art thermal devices because the cartridges, and even components of the cartridges, may be easily replaced if they are damaged or wear out.

BRIEF DESCRIPTION OF THE DRAWINGS

FIG. 7 is a perspective view of the stripping blade incorporated into the thermal wire stripper cartridge of the present invention.

FIG. 8 is a perspective view of the stripping blade with the assembly of FIG. 6 installed for the thermal wire stripper cartridge of the present invention.

FIG. 9 is an end view of an alternative configuration of the stripping blade of the thermal wire stripper cartridge of the present invention.

FIG. 10 is a perspective, partial phantom view of the alternative configuration of the stripping blade of FIG. 9 for the wire stripper cartridge of the present invention.

DETAILED DESCRIPTION OF THE INVENTION

Figure 1A:
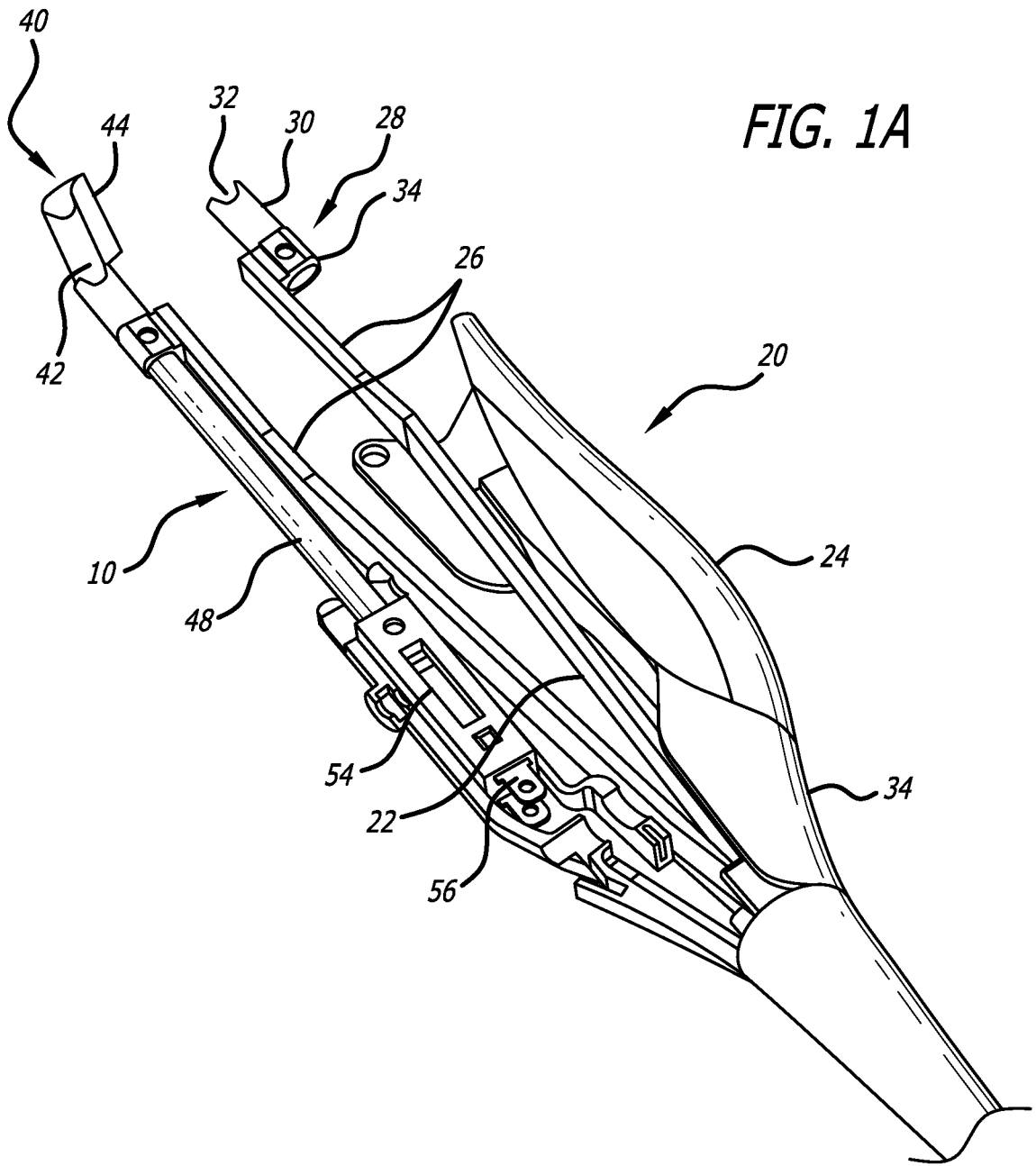
FIG. 1A is a perspective view of the primary components of the thermal device including wire stripper cartridges of the present invention.
Figure 1B:
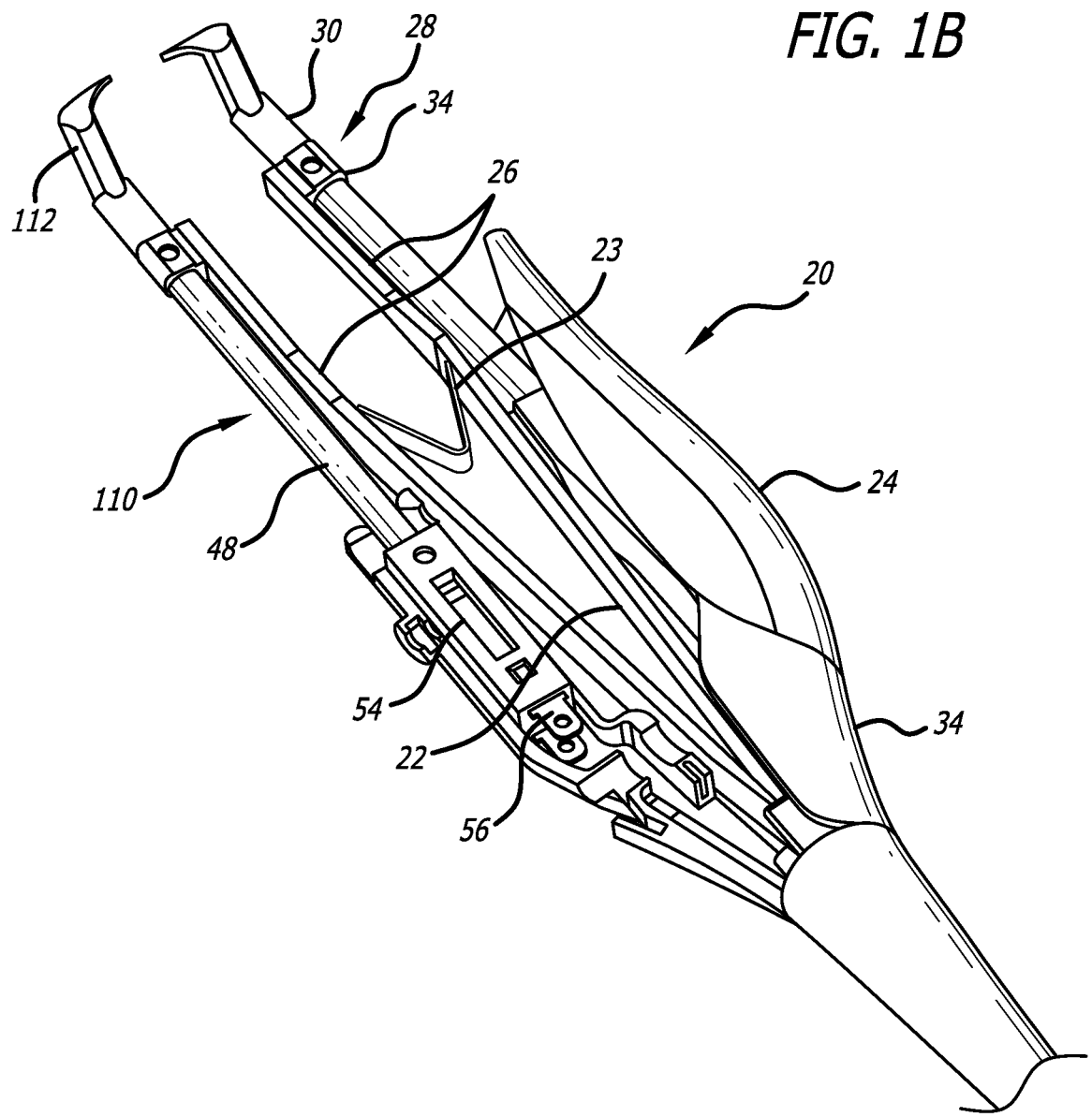
FIG. 1B is a perspective view of the primary components of an alternative version of the thermal device including thermal tweezer cartridges of the present invention.

FIGS. 1A and 1B are perspective views of the primary components of a thermal tool 20, shown for example as including a wire stripper blade cartridge 10 in FIG. 1A and thermal tweezer cartridges 120 in FIG. 1B. The thermal tool 20 includes a frame 22 partially covered within a handle grip 24, only the right side of which is depicted in FIGS. 1A and 1B. The handle grip 24 may comprise a two component construction with an inner shield formed from a thermoplastic material and an outer grip formed from a soft plastic, elastomeric or thermoplastic material. The inner shield is provided to protect the users hand from the heated sections of the thermal tool 20.

Figure 3:
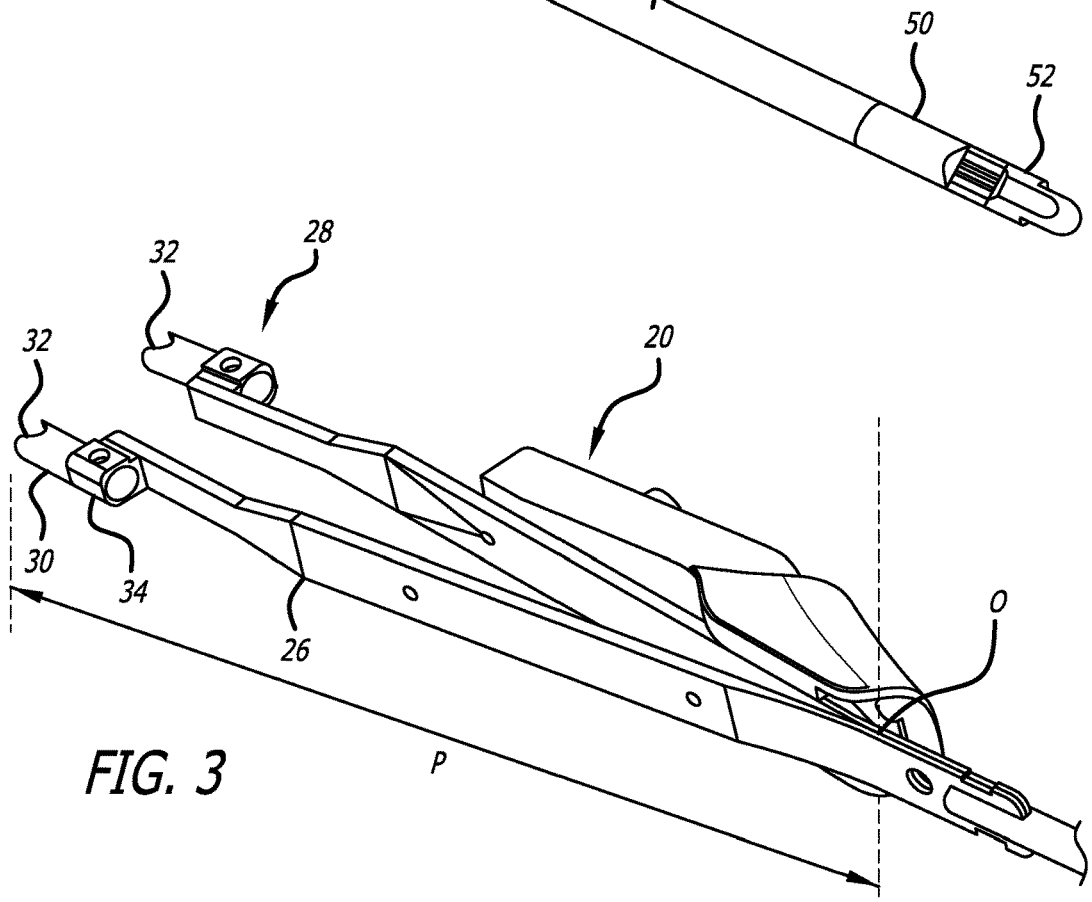
FIG. 3 is a perspective view of the frame components of the thermal device of the present invention.

The frame 22 comprises two oppositely disposed prongs 26, each of which include a chuck 28 fixed to the distal end of the prongs 26. The prongs 26 are preferably formed from stainless steel, spring steel or a similar metal material. Each of the chucks 28 include a hollow cylindrical segment 30, terminating at a distal end with a cutout 32. The proximal end of the hollow cylindrical segment 30 includes a bracket 34 to secure the chuck to distal ends of the prongs 26. These features of the chucks 28 are depicted in FIG. 3. The chucks are preferably formed by a metal injection molding, casting or machining process from stainless steel or iron alloy material.

The frame 22 may include a resilient feature to bias the prongs 26 away from each other. As depicted in FIG. 1A, the resiliency to bias the prongs 26 is provided by the "V" shaped configuration of the prongs 26 connected at their proximal ends as shown in FIG. 1A. However, a resilient element such as a leaf spring 23, as shown in FIG. 1B, or alternatively a coil spring or elastomeric resilient elements may be used. The proximal ends of the prongs 26 forming the frame 22 may be secured for example by tungsten inert gas welding, spot welding or by the use of a fastener such as a rivet, screw or bolt. This construction allows for precise orientation of the chucks 28 at the ends of the prongs 26 which precisely align the blade cartridges 10 of FIG. 2A or the thermal tweezer cartridge 110 of FIG. 2B.

The distal ends of the blade cartridges 10 when inserted into the thermal tool 20 include opposingly disposed stripping blades 40. The stripping blades 40 include a hollow, part cylindrical section 42 and a flattened blade 44. The stripping blades 40 are preferably formed in a metal injection molding process, although a casting or machining process may be used. The stripping blades 40 are preferably formed from an iron alloy, nickel alloy or similar heat resistant material. The part cylindrical section 42 defines a hollow interior into which a heater assembly is to be inserted, as discussed below. The blade cartridges 10 are mounted into the chucks 28 with the stripping blades 40 precisely aligned and positioned at the distal end of the thermal tool 20. Each of the chucks include the cutout 32 at their distal ends that receive and snugly fit the shape of the part cylindrical section 42 of the stripping blade 40, so that the stripping blades 40 are rotationally fixed and precisely positioned within the chucks 28.

Figure 2A:
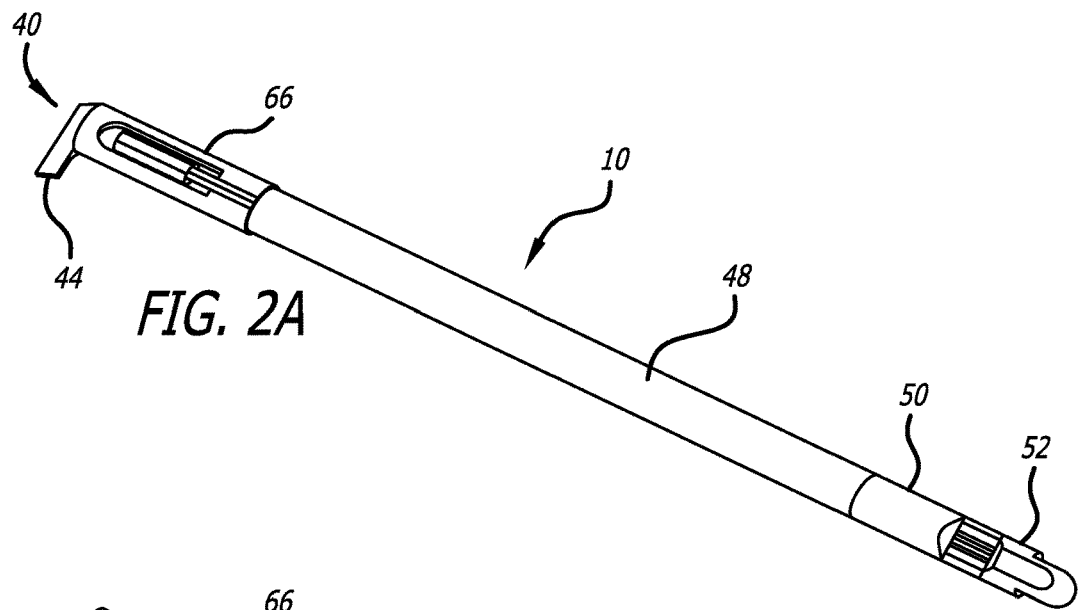
FIG. 2A is a perspective view of one thermal wire stripper cartridge of the present invention.

FIG. 1A depicts the thermal tool 20 including a blade cartridge 10, and FIG. 2A depicts one of the blade cartridges 10 removed from the frame 22 of the thermal tool 20. The blade cartridges 10 include sleeves 48, extending proximally from the stripping blades 40 and terminating in connectors 50 at the proximal end of the sleeves 48. The connectors 50 include electrical contacts 52 that electrically connect to contacts (not shown) within connector sockets 54 secured within the handle grips 24. The connector sockets 54 include contacts 56 that allow connection to a power supply (not shown). The connector sockets 54 are enclosed under the handle grip 24, as depicted with one half of the handle grip 24 exploded away from the frame 22 in FIG. 1. The sleeves 48 enclose and protect wire conductors (not shown) extending from the electrical contacts 52 to the stripping blades 40 and the heater assembly within the stripping blades 40, as discussed below.

Figure 2B:
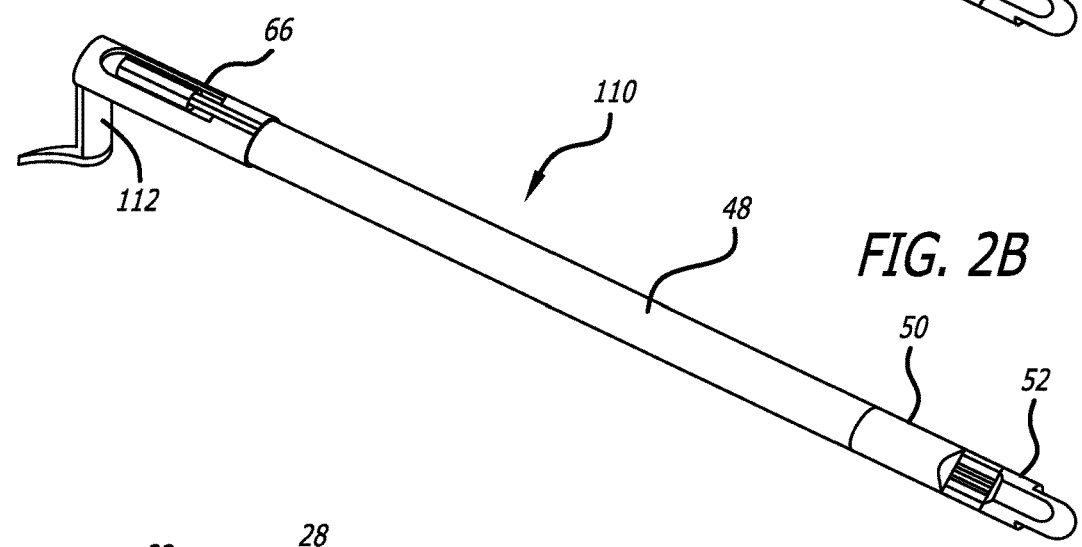
FIG. 2B is a perspective view of one thermal tweezer cartridge of the present invention

FIG. 1B depicts the thermal tool 20 including thermal tweezer cartridges 110, and FIG. 2B depicts one of the thermal tweezer cartridges 110. The thermal tweezer cartridge 110 includes a tweezer tip 112 that may have various configurations. As depicted in FIG. 2B, the tweezer tip 112 may be pointed, however it may terminate in a flat edge to allow grasping. The tweezer tip 112 has a hollow axial section to allow the insertion of the heater assembly discussed below.

Figure 4:
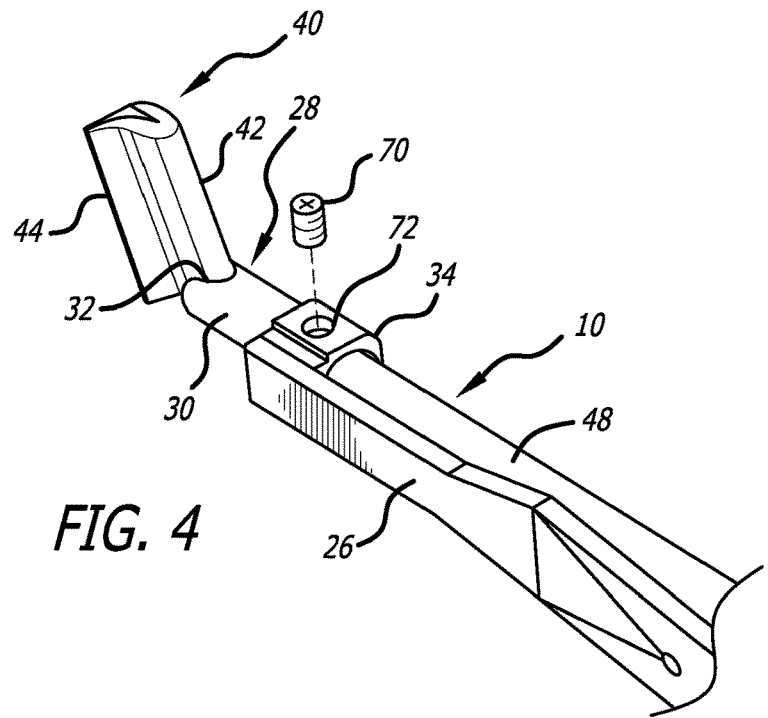
FIG. 4 is a perspective view of one prong of the thermal device of FIG. 1 with a thermal wire stripper cartridge installed.
Figure 5:
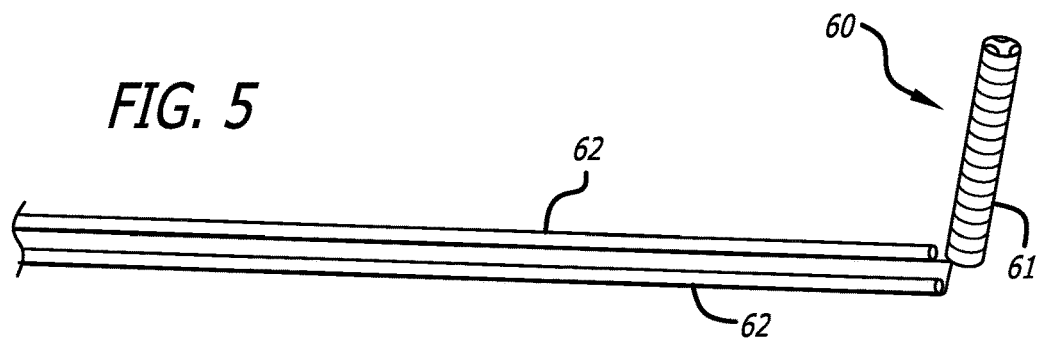
FIG. 5 is a side view of the heater assembly and conductors incorporated into the thermal wire stripper cartridge or the thermal tweezer cartridge of the present invention.

FIG. 3 provides a perspective view of the frame 22, prongs 26 and chucks 28, without the blade cartridges 10 of FIG. 2A. FIG. 4 depicts the distal end of one of the prongs 26 with the blade cartridge 10 installed, with the sleeve 48 of the blade cartridge 10 extending proximally from the chuck 28. These figures also depict the cutout 32 of the chucks 28 that have a shape conforming to the part cylindrical section 42 of the stripping blade 40.

FIGS. 5, 6, 7 and 8 depict the components and illustrate one embodiment of the heater assembly 60 that is installed in into the stripping blade 40 of FIG. 2A or the tweezer tip 112 of FIG. 2B. The heater assembly may comprise a coil 61 preferably formed from a Kanthal® iron-chromium-aluminium (FeCrAl) alloy or nickel-chromium alloy (Ni—Cr) wire wrapped around a core, and the coil 61 is then coated with a ceramic insulator. Alternatively, the heater assembly 60 may include a ceramic cylinder with a plurality of linear bores into which the Kanthal® iron-chromium-aluminium (FeCrAl) alloy or nickel-chromium alloy (Ni—Cr) wires are inserted to form a linear coil, whereby the wires heat the ceramic cylinder.

Figure 6:
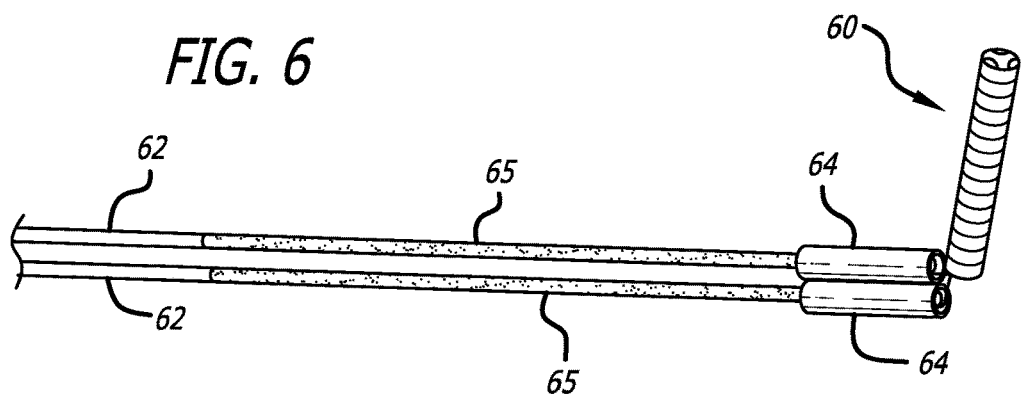
FIG. 6 is another side view of the heater assembly and conductors with sleeves incorporated into the thermal wire stripper cartridge or the thermal tweezer cartridge of the present invention.

The ends of the coil 61 of the heater assembly 60 are connected to a pair of copper or nickel wire conductors 62. The distal ends of the wire conductors are protected within thermal sleeves 64. The coil 61 portion of the heater assembly 60 is a generally cylindrical structure that fits securely within a hollow interior of the part cylindrical section 42 of the stripping blade 40. FIG. 6 depicts the heater assembly 60 and the pair of thermal sleeves 64 enclosing short segments at the distal ends of the pair of conductors 62 adjacent the heater assembly 60. The conductors 62 may also be threaded into or coated with insulator tubes 65.

FIG. 7 is a perspective view of one stripping blade 40, without the heater assembly 60 (FIG. 6) installed. As depicted in FIG. 7, the stripping blade 40 includes a "C" shaped cross-section cylinder 66 extending proximally from one end of the part cylindrical section 42. The "C" shaped cross-section cylinder 66 is sized and configured to be inserted and securely held within the hollow cylindrical segment 30 of the chuck 28 shown in FIG. 3. As depicted in FIG. 8, the "C" shaped cross-section cylinder 66 portion of the stripping blade 40 has a cavity 68 that allows the insertion of the heater assembly 60 into the cylindrical section 42 of the stripping blade 40, and the cavity 68 then accommodates the thermal sleeves 64 enclosing the end segments of the conductors 62. The conductors 62 extend out from proximal end of the "C" shaped cross-section cylinder 66 portion of the stripping blade 40 through a reduced cross sectional portion of the cavity 68. The thermal sleeves 64 are preferably sized to fit securely within the cavity 68.

The replaceable blade cartridge 10 for the thermal wire stripper 20 is assembled by forming the stripping blade 40 preferably by a metal injection molding process to include the "C" shaped cross-section cylinder 66 portion sized and designed to be inserted into and fit securely within the chuck 28 of the thermal wire stripper 20, a part cylindrical section 42 extending at an angle of 70 to 120 degrees to the "C" shaped cross-section cylinder 66 portion, the part cylindrical section 42 having a hollow axial section for receiving a heater assembly, and a flattened blade 44 extending from the part cylindrical section 42.

The heater assembly 60 is formed from a heater coil 61 preferably using a Kanthal wire or Nichrome wire formed into a circumferential or linear coil and a ceramic core to form a generally cylindrical heater coil 61, with the ends of the Kanthal wire or Nichrome wire of the heater coil 61 being attached to conductors 62 formed from a copper or nickel wire. The heater assembly 60 may then be inserted through the opening of the "C" shaped cross-section cylinder 66 portion and into the hollow axial section of the part cylindrical section 42 of the stripping blade 40. The conductors 62 attached to the heater coil 61 may be threaded through a thermal sleeve 64 and protected by an insulator tube 65. The distal ends of the conductors 62 and the sleeves 64 are then inserted into or threaded through the "C" shaped cross-section cylinder 66 portion of the stripping blade 40. The conductors 62 and the proximal end of the "C" shaped cross-section cylinder 66 portion of the stripping blade 44 are then inserted into the distal end of the sleeve 48. The proximal ends of the conductors 62 extending from the sleeve 48 are then attached to the contacts within the connector 50. The connector 50 is then attached to the end of the sleeve 48 to complete the blade cartridge 10. The assembly of the blade cartridge 10 including the stripping blade 40 attached to one end of the sleeve 48 the opposite end of which terminates at the connector 50 may be securely assembled with press fit connections or soldered together.

The connector 50 and sleeve 48 of the blade cartridge 10 can be inserted through the chuck 28 until the part cylindrical section 42 of the stripping blade 40 engages with the cutout 32 of the chuck 28 and the connector 50 establishes electrical contact with a connector socket 52 mounted in the handle grip 24 of the thermal wire stripper 20. It may be appreciated that the part cylindrical section 42 and the cutout 32 may have any shape that will allow a snug fit preventing rotation of the blade cartridge 10 within the chuck 28.

An alternative configuration contemplates having the "C" shaped cross-section cylinder 66 removably secured within the hollow cylindrical segment 30 of the chuck 28 for example by the use of a set screw 70 inserted through an orifice 72 in the proximal end of the chuck 28, as depicted in FIG. 4. Removing the set screw 70 allows the blade cartridge 10 to be extracted from the chuck 28. The heater assembly 60 may then be removed from the cylindrical section 42 of the stripping blade 40, so that a new heater assembly 60 may be installed to repair a heater assembly that has shorted out. Alternatively, after the heater assembly 60 is removed, the stripping blade 40 may be removed from the sleeve 48 and replaced with a new stripping blade 40, and the original or a replacement heater assembly may be installed into the new stripping blade 40.

FIGS. 9 and 10 depicted an alternative configuration for the stripping blade 140. By comparison to the stripping blade 40 depicted in FIGS. 6 and 7 that have a unitary structure formed of a single material, the alternative configuration of the stripping blade 140 of FIGS. 9 and 10 have the part cylindrical section 142 attached to a flat blade 144 with a weld, rivet or set screw 146. The flat blade 144 may be formed from a metal that is the same as or different from the heat conducting metal of the cylindrical section 142. For example, both the cylindrical section 142 and the flat blade 144 may be formed from copper or Inconel (a nickel-chromium-based alloy), or the cylindrical section 142 may be formed from copper while the flat blade 144 may be formed from Inconel, or vice versa. FIGS. 9 and 10 also illustrate that the flat blade 144 may include one or more half-circular cutouts 148 of differing sizes to accommodate various gage wires. The half-circular cutouts 148 may be included in the configurations of the stripping blades 40 depicted in FIGS. 6 and 7.

Figure 11:
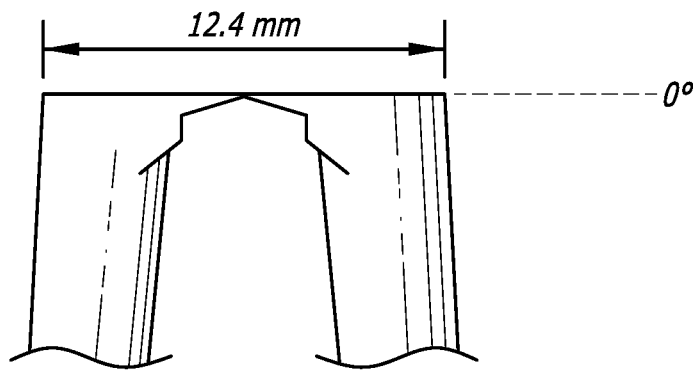
FIG. 11 is a side view of the design of the blades of a prior art wire stripper.
Figure 12:
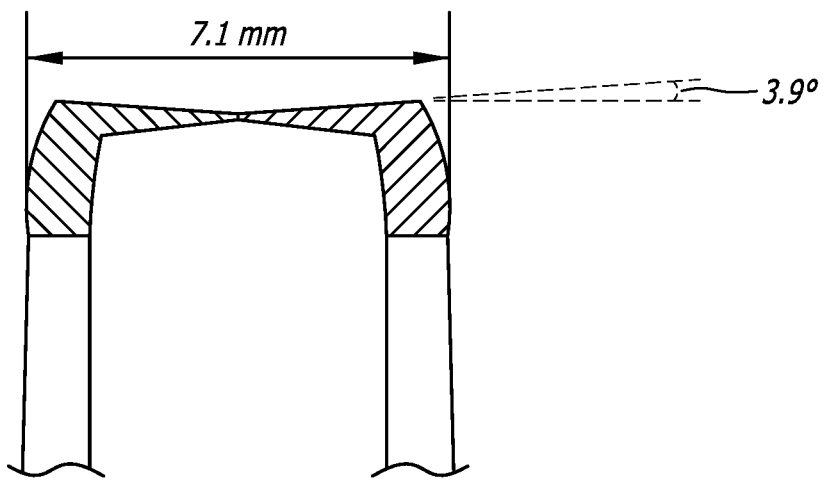
FIG. 12 is a side view of the design of the blades of a second prior art wire stripper.
Figure 13:
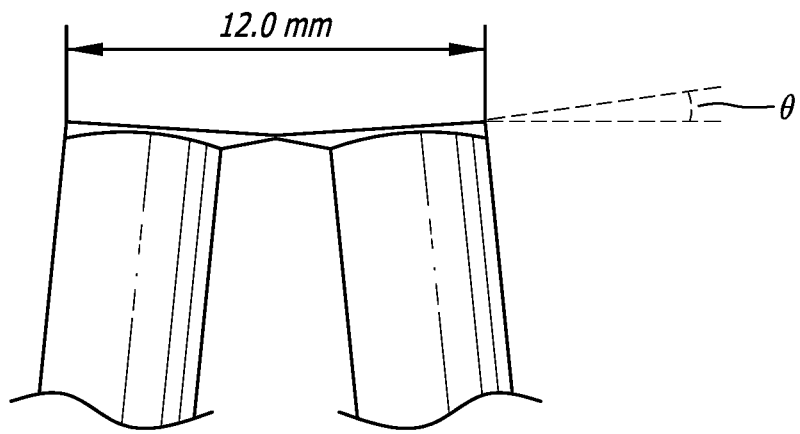
FIG. 13 is a side view of the design of the stripping blades for an embodiment of the wire stripper of the present invention.

FIGS. 11 and 12 depict side views of two different prior art wire stripper blade configurations. In FIG. 11, the blade edges with the flat distal ends aligned on a straight line. In FIG. 12, the flat distal ends of the blades may taper at an angle of about 4 degrees. The configuration of FIG. 12 is an example of what is disclosed in U.S. Pat. No. 3,980,861. As illustrated in FIG. 13, the present invention contemplates having the flat distal ends of the stripping blades 40 taper at an angle θ, which may be up to about 20 degrees, with a taper angle θ being optimized to provide the best angle at which to cut the insulation material of the wire being striped and also improve the ease of removing the insulator from the wire conductor. The preferred taper of the stripping blades 40 may be accomplished by fabricating the blades themselves to have an inwardly tapered edge, or the blades themselves may be flat at their distal ends while the prongs 26 of the thermal wire stripper 20 may be shaped so as to have the chucks 28 tapering inwardly at the preferred angle.

The construction of the thermal tool 20, with the opposing "V" prongs 26 impacts the preferred taper angle θ, which may be determined with an appreciation of the following factors. As depicted in FIG. 3, in the configuration with stripping blades 40 fixed within the frame of the thermal tool 20 with the flattened blade 44 configured to close on a wire with rotary motion with fixed point "O" of the frame as a supporting point, θ is the blade edge angle which is preferably between 0 degrees and 20 degrees ($0<\theta<20$), "P" is the length between the fixed point O and the distal end point where the edge of the flattened blade 44 will contact with the external diameter of the insulator. When squeezed by a user, the distal edge of the flattened blade 44 will rotate with the fixed point O as the supporting point until the blade edges contact with the wire whose diameter is d (or one blade edge contacts with another). It is ideal to have the angle where both sides of the flattened blades 44 contact with the insulator shaped so that the blade mating angle θ will be between 180 degrees (max) and about 160 degrees (min) when the blade edges contact with the external diameter of insulator. With this configuration, the heat from the stripping blades 40 will conduct to the insulator effectively to melt and strip the insulator easily.

The invention has been described in detail above in connection with the appended figures. Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:

1. A thermal tool comprising:
   a frame having a pair of oppositely disposed prongs each terminating in a chuck, wherein said chuck on each of said prongs includes a shaped cutout recessed from a distal end of said chuck;
   a pair of thermal cartridges each having a thermal distal end assembly with a first portion designed to fit securely within said chucks of said frame, each thermal distal end assembly further including a hollow section projecting at an angle from said first portion and a blade or tip attached to said hollow section, said shaped cutout of said chuck having a shape matching the shape of the outer surface of said hollow section of said thermal cartridges, whereby said outer surface of said hollow section engages said shaped cutout of the distal end of said chuck to precisely align the thermal distal end assemblies; and
   a pair of heater assemblies each shaped and sized to fit securely within said hollow section of said thermal cartridges.

2. The thermal tool of claim 1, wherein said blade of said thermal cartridge is removably attached to said hollow section.

3. The thermal tool of claim 1, wherein said blade of said thermal cartridges is a stripping blade formed from an iron or nickel alloy by metal injection molding, casting or machining process.

4. The thermal tool of claim 1, wherein said heater assembly comprises an iron-chromium-aluminium (FeCrAl) or Nickel-Chromium (Ni—Cr) alloy wire forming a coil with a ceramic core.

5. A thermal tool comprising:
   a frame having a pair of oppositely disposed prongs each terminating in a chuck, wherein said chuck on each of said prongs includes a shaped cutout;
   a pair of thermal cartridges each having a thermal distal end assembly with a first portion designed to fit securely within said chucks of said frame, each thermal distal end assembly further including a hollow section projecting at an angle from said first portion and a blade or tip attached to said hollow section, said shaped cutout of said chuck having a shape matching the shape of the outer surface of said hollow section of said thermal cartridges, wherein said pair of thermal cartridges further include conductors extending proximally from said heater assemblies within a sleeve, said sleeve attached at a distal end to said first portion of said thermal cartridges, said sleeve and said conductors attached at their proximal ends to a connector; and a pair of heater assemblies each shaped and sized to fit securely within said hollow section of said thermal cartridges.

6. A thermal tool comprising:
a frame having a pair of oppositely disposed prongs each terminating in a chuck;
   a pair of thermal cartridges each having a thermal distal end assembly with a first portion designed to fit securely within said chucks of said frame, each thermal distal end assembly further including a hollow section projecting at an angle from said first portion and a blade or tip attached to said hollow section, said hollow section of said thermal distal end having an outer shape matching said cutout of said chuck, wherein said pair of thermal cartridges further include conductors extending proximally from said heater assemblies within a sleeve, said sleeve attached at a distal end to said first portion of said thermal cartridges, said sleeve and said conductors attached at their proximal ends to a connector; and a pair of heater assemblies each shaped and sized to fit securely within said hollow section of said thermal cartridges.

7. A thermal wire stripper comprising:
a frame having a pair of oppositely disposed prongs each terminating in a chuck, each chuck having a cutout at its distal end; and
a pair of blade cartridges each having stripping blades, the stripping blades having a first portion designed to fit securely within said chucks of said frame, a part cylindrical hollow section extending at an angle from said first portion, said part cylindrical hollow section removably enclosing a heater assembly, and a flat or flattened blade extending from said part cylindrical section, whereby said cutout of said chuck has a shape matching the shape of an exterior surface of said part cylindrical hollow section of said stripping blades to precisely align and position said stripping blades within said chucks preventing rotational misalignment of said stripping blades.

8. The thermal wire stripper of claim 7, wherein said heater assembly further comprises an iron-chromium-aluminium (FeCrAl) alloy wire forming a coil with a ceramic core and said blade cartridges further comprising conductors extending proximally from said heater assemblies within a sleeve, said sleeve attached at a distal end to said first portion of said stripping blade, said sleeve and said conductors attached at their proximal ends to a connector.

9. The thermal wire stripper of claim 7, said frame further comprising:
a pair of handle grips each respectively secured to one of said pair of prongs, said handle grips having a two component construction with an inner shield formed from a thermoplastic material and an outer grip formed from a soft plastic material, a thermoplastic material, or an elastomeric material.

10. The thermal wire stripper of claim 7, wherein said part cylindrical hollow section extends at an angle of 70 degrees to 120 degrees to said first portion of said stripping blades.

11. A thermal tool comprising:
a frame having a pair of oppositely disposed prongs each terminating in a chuck, each chuck having a cutout at its distal end;
a pair of cartridges each having a distal end, each distal end having a first portion designed to fit securely within said chucks of said frame, a part cylindrical hollow section extending at an angle to said first portion, said part cylindrical hollow section enclosing a heater assembly, and an edge extending from said part cylindrical section, said cartridges further including a sleeve secured at a distal end to said first portion and at a proximal end to a connector; and
each of said pair of distal ends is securely affixed within said pair of chucks to have distal end faces beveled at an angle whereby when opposing edges of said distal end faces are touched together, said flat distal end faces define an obtuse angle.

12. The thermal tool of claim 11, wherein said flat distal end faces of said cartridges are stripping blades beveled at an angle of between four degrees to six degrees.

13. A replaceable cartridge for a thermal tool, comprising:
a blade, a sleeve secured at a distal end to a first portion of said blade and at a proximal end to a connector, and a heater assembly;
said blade having a first portion designed to fit securely within a chuck of a frame of a thermal tool;
a part cylindrical section extending generally perpendicular to said first portion, said part cylindrical section having a hollow axial section for receiving said heater assembly, said blade extending from said part cylindrical section.

14. A two piece stripping blade for a thermal wire stripper, comprising:
a blade body having a first portion designed to fit securely within a chuck of a frame of a thermal wire stripper and a part cylindrical section extending generally perpendicular to said first portion, said part cylindrical section having a hollow axial section for removably receiving a heater assembly; and
a flat blade removably attached to said part cylindrical section of said blade body whereby said flat blade may be removed and replaced.

15. A thermal tool comprising:
a frame having a pair of oppositely disposed prongs each terminating in a chuck;
a pair of cartridges each having a thermal distal end assembly having a first thermal tip portion, a central sleeve and a proximal connector, each thermal tip portion having a first section designed to fit securely within said chucks of said frame, each thermal tip portion further including a second hollow section encasing a heater assembly shaped and sized to fit securely within said second hollow section, said second hollow section having an exterior blade surface aligned parallel to said heater assembly within said hollow section.

16. A heating tool comprising:
a frame having a pair of oppositely disposed prongs each terminating in a chuck; and a pair of blade cartridges each having a stripping blade at a distal end of said blade cartridge, said stripping blade having a first portion designed to fit securely within said chucks of said frame, and said stripping blade having a second portion enclosing a heater assembly within said stripping blade.

17. A method of assembling a replaceable stripping cartridge for a thermal tool having a frame including a pair of oppositely disposed and resiliently biased prongs, each prong terminating in a chuck, the method comprising:

forming a stripping blade having a first portion designed to fit securely within said chuck of said frame of said thermal tool, a part cylindrical section extending at a generally perpendicular angle of 70 to 120 degrees to said first portion, said part cylindrical section of said stripping blade having a hollow axial section for removably receiving a heater assembly, and a flat or flattened blade extending from said part cylindrical section;

forming a heater coil from a Kanthal wire and a ceramic core and attaching the ends of the Kanthal wire to conductors;

inserting said heater assembly into said hollow axial section of said part cylindrical section of said stripping blade;

threading said conductors attached to said Kanthal wire heater coil through said first portion of said stripping blade;

inserting said conductors and the proximal end of said first portion of said stripping blade into the distal end of a sleeve;

attaching a connector to the proximal end of said conductors and said sleeve, said stripping blade, said sleeve and said connector forming a stripping cartridge; and inserting said connector end of said stripping cartridge through said chuck until said part cylindrical section of said stripping blade engages with said chuck and said connector establishes electrical contact with a connector socket mounted in the frame of said thermal tool.

18. The method of claim 17 further comprising:
inserting each of conductors attached to said Kanthal wire of said heater coil into a thermal sleeve and an electrical insulator tube.

19. A thermal tool comprising:
a frame having a pair of oppositely disposed prongs each terminating in a chuck; and
a pair of cartridges each having a thermal distal end assembly having a thermal tip portion, a central sleeve and a proximal connector, each thermal tip portion designed to fit securely within said chucks of said frame, each thermal tip portion further including a heater assembly shaped and sized to fit securely within hollow sections of blades affixed to distal ends of said cartridges, said pair of cartridges having conductors extending proximally from said heater assemblies within said central sleeve and attached at their proximal ends to said connector.

20. A thermal tool comprising:
a frame having a pair of oppositely disposed prongs each terminating in a chuck; and
a pair of cartridges each having a thermal distal end assembly having a thermal tip portion, a central sleeve and a proximal connector, each thermal tip portion designed to fit securely within said chucks of said frame, each thermal tip portion further including a heater assembly, wherein said thermal tip portions form blades having a first portion designed to fit securely within the chucks of said frame, and each of said blades further including a hollow section projecting at an angle from said first portion and said blade attached to said hollow section, and a pair of heater assemblies each shaped and sized to fit securely within said hollow section of said blades.

21. The thermal tool of claim 20, wherein said chuck on each of said prongs includes a shaped cutout having a shape matching the shape of the outer surface of said hollow section of said blades.

22. The thermal tool of claim 20, wherein said blades of said thermal tip portion are removably attached stripping blades.

23. The thermal tool of claim 20, wherein said blades are formed from an iron or nickel alloy metal by an injection molding, casting or machining process.

24. The thermal tool of claim 20, wherein said heater assembly comprises an iron-chromium-aluminium (FeCrAl) or Nickel-Chromium (Ni—Cr) alloy wire forming a coil with a ceramic insulator.

25. A thermal tool comprising:
a frame having a pair of oppositely disposed prongs each terminating in a chuck; and
a pair of cartridges each having a thermal distal end assembly having a thermal tip portion, a central sleeve and a proximal connector, each thermal tip portion designed to fit securely within said chucks of said frame, each thermal tip portion further including a heater assembly, wherein said pair of cartridges further include conductors extending proximally from said heater assemblies within said central sleeve, said sleeve attached at a distal end to said thermal tip portion, said sleeve and said conductors attached at their proximal ends to said connector.

* * * * *